US011501767B2

(12) United States Patent
Al Haddad et al.

(10) Patent No.: US 11,501,767 B2
(45) Date of Patent: Nov. 15, 2022

(54) METHOD FOR OPERATING A MOTOR VEHICLE HAVING AN OPERATING DEVICE

(71) Applicant: AUDI AG, Ingolstadt (DE)

(72) Inventors: Christian Al Haddad, Ingolstadt (DE); Stefan Maiwald, Ingolstadt (DE)

(73) Assignee: Audi AG, Ingolstadt (DE)

( * ) Notice: Subject to any disclaimer, the term of this patent is extended or adjusted under 35 U.S.C. 154(b) by 24 days.

(21) Appl. No.: 16/479,776

(22) PCT Filed: Nov. 28, 2017

(86) PCT No.: PCT/EP2017/080590
§ 371 (c)(1),
(2) Date: Jul. 22, 2019

(87) PCT Pub. No.: WO2018/133981
PCT Pub. Date: Jul. 26, 2018

(65) Prior Publication Data
US 2020/0349936 A1 Nov. 5, 2020

(30) Foreign Application Priority Data

Jan. 23, 2017 (DE) ...................... 10 2017 200 976.4

(51) Int. Cl.
*G10L 15/22* (2006.01)
*G10L 13/00* (2006.01)
*G10L 15/00* (2013.01)

(52) U.S. Cl.
CPC .............. *G10L 15/22* (2013.01); *G10L 13/00* (2013.01); *G10L 15/005* (2013.01); *G10L 2015/223* (2013.01)

(58) Field of Classification Search
CPC ....... G10L 15/22; G10L 13/00; G10L 15/005; G10L 2015/223; G10L 2015/221
(Continued)

(56) References Cited

U.S. PATENT DOCUMENTS 6,243,675 B1   6/2001 Ito
7,277,846 B2  10/2007 Satoh
(Continued)

FOREIGN PATENT DOCUMENTS

DE        60109979 T2    2/2006
DE    102006057159 A1    6/2008
(Continued)

OTHER PUBLICATIONS

International Search Report and Written Opinion of the International Searching Authority directed to related International Patent Application No. PCT/EP2017/080590, dated Apr. 6, 2018, with attached English-language translation; 21 pages.
(Continued)

*Primary Examiner* — Pierre Louis Desir
*Assistant Examiner* — Nicole A K Schmieder
(74) *Attorney, Agent, or Firm* — Sterne, Kessler, Goldstein & Fox P.L.L.C.

(57) ABSTRACT

The invention relates to a method for operating a motor vehicle having an operating device, which includes a speech recognition and language determination device. A recognition of a voice input of a user of the motor vehicle, and a check as to whether a language of the voice input corresponds to the first operating language take place in a first operating mode with a first operating language. Depending on a result of the checking process, a confidence value is assigned to the voice input, which describes a probability with which the language of the voice input is the second operating language. Depending on the assigned confidence value, a query signal is generated, which describes a request, understandable in a second operating language, to the user for indicating the operating mode to be set or the operating language to be set. In response to a received operating
(Continued)

signal, the operating mode to be set or the operating language to be set are set.

17 Claims, 1 Drawing Sheet

(58) Field of Classification Search
USPC .......................................................... 704/251
See application file for complete search history.

(56) References Cited

U.S. PATENT DOCUMENTS

| | | | |
|---|---|---|---|
| 7,660,715 B1 * | 2/2010 | Thambiratnam | ....... G10L 15/22 |
| | | | 704/244 |
| 7,949,517 B2 | 5/2011 | Eckert et al. | |
| 9,275,635 B1 * | 3/2016 | Beaufays | ................ G10L 15/32 |
| 2008/0162146 A1 | 7/2008 | Eckert et al. | |
| 2009/0099763 A1 | 4/2009 | Muramatsu et al. | |
| 2014/0244259 A1 * | 8/2014 | Rosario | ................... G10L 15/19 |
| | | | 704/254 |
| 2015/0006147 A1 * | 1/2015 | Schmidt | ................ G10L 15/005 |
| | | | 704/8 |

FOREIGN PATENT DOCUMENTS

| | | |
|---|---|---|
| WO | WO-2012/011885 A1 | 1/2012 |
| WO | WO-2015/185464 A1 | 12/2015 |

OTHER PUBLICATIONS

International Preliminary Report on Patentability directed to related International Patent Application No. PCT/EP2017/080590, completed Dec. 14, 2018, with attached English-language translation; 13 pages.

* cited by examiner

METHOD FOR OPERATING A MOTOR VEHICLE HAVING AN OPERATING DEVICE

TECHNICAL FIELD

The disclosure relates to a method for operating a motor vehicle having an operating device. The operating device is configured in a first operating mode to be used in a first, preset operating language, and in a second operating mode the operating device is configured to be used in a second operating language.

BACKGROUND

In motor vehicles, the focus is increasingly placed on comprehensive convenience electronics, by means of which convenience systems, such as a navigation device, an auxiliary heater, or air conditioning, may be electrically operated. In order to enable a user of the motor vehicle to operate both the convenience electronics and the actual drive of the motor vehicle, a corresponding operating device, i.e., a device or a device component, which serves as a user interface between the user and the system to be operated, must be provided. Such an operating device may be designed, for example, as a multimedia interface ("MIMI") or infotainment system, and may include, for example, a touch-sensitive screen and/or push-button. The operating device may be operated in different operating languages, i.e., multiple languages may be stored, in which a text is output, for example, for explaining a function of a menu item. In conventional operating devices, for example, the user may select a corresponding operating language in a language menu.

In order to distract the user as little as possible from a driving process, the operating device may also output pieces of information, for example, navigation instructions, via a speaker. However, to change a voice output or speech recognition into a desired or native language, the user must again navigate through a written menu.

However, with the verbal language of the operating device, a switch is also made to the written language, i.e., also the language of the menus for the language switch. Thus, for example, an Englishman may be offered the option "Select Language" in a menu in German, but if he does not speak German, he is unable to understand the menu. It is even more difficult if the font is foreign, for example, Arabic characters for a German user or Latin letters for an Arabic user. In addition, the switch via the font menu requires time, is troublesome, and possibly the user only determines during a trip that a language is set that he/she does not understand. This results not only in user dissatisfaction but also in an unnecessary distraction.

DE 601 09 979 T2 describes a navigation device having a guidance language, which corresponds to a language used. A speech recognition and language determination device examines a voice input by a user, the language accordingly being determined as the language used, based on each word contained in the voice input.

WO 2015/185464 A1 discloses an assistance system which is controllable by means of voice input. A speech recognition and language determination device assigns a meaning to voice inputs in accordance with particular systems and rules.

However, in these methods, the user is unassisted in choosing through an operating menu in order to set a preferred language. Even if the operating device recognizes which language he is currently speaking, he must select the language he wants by navigating through the operating menu of the operating device.

One object underlying the disclosure is to assist the user of the motor vehicle in quickly selecting or changing the operating language.

The stated object is achieved by the method according to the disclosure and by the devices according to the disclosure in accordance with the subordinate patent claims.

DETAILED DESCRIPTION

Figure 1:
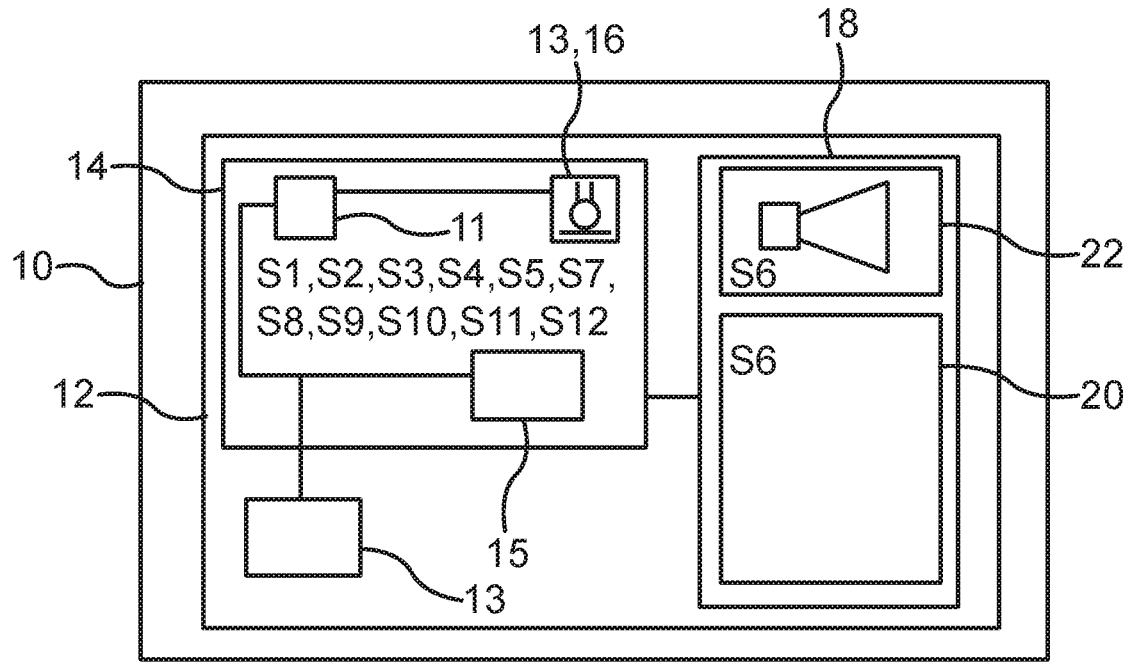
FIG. 1 is a schematic representation of one embodiment of the method according to the present disclosure.

The disclosure is based on the concept of being able to confirm, after a determination of the language spoken by the user in the particular language, i.e., in the language in which the user has spoken, that he wishes to change the operating language of the operating device to the language he has just spoken. This eliminates the need to navigate through an operating menu to switch the language. In addition, the user also has the option of remaining in the original operating language.

The method according to the disclosure serves to operate a motor vehicle having an operating device which, in a first operating mode, is configured to be used in a first, preset operating language and which, in a second operating mode, is configured to be used in a second operating language. In other words, a first operating language is specified in the first operating mode, and in the second operating mode a second operating language is specified, which may preferably differ from the first operating language.

In the first operating mode, a speech recognition and language determination device of the operating device detects or recognizes a voice input from the user of the motor vehicle, and determines that the user has said something. A speech recognition and language determination device in this case is considered to be a device component or a component of the operating device, which is configured to detect and recognize a voice input by the user, i.e., to carry out speech recognition, and to determine in which language the voice input was made. A voice input in this case is a verbal utterance of the user, for example, a spoken word or a spoken word sequence.

The activated speech recognition and language determination device checks whether the language of the detected or recognized voice input corresponds to the first operating language. Depending on a result of the checking procedure, a confidence value is assigned to the voice input, the confidence value describing a probability with which the language of the voice input is the second language. If, therefore, the speech recognition and language determination device concludes that the language of the voice input is not the first operating language, the voice input may be assigned a confidence value which describes that there is a high probability that the language of the voice input may, for example, be the second operating language.

Depending on the assigned confidence value, the speech recognition and language determination device generates a query signal that describes a request understandable in the second operating language to the user for indicating the operating mode to be set and/or the operating language to be set. The query signal may, for example, be an audio signal capable of describing a voice output in the second operating language, in which the user is asked if he wishes to use the operating device in the second operating language. Alternatively, the query signal may, for example, be an image signal capable of describing a corresponding text in the second operating language or an image language, for example, an image of a country flag corresponding to the second operating language, followed by an image of a question mark.

The speech recognition and language determination device transmits the query signal, for example, to an output device of the motor vehicle, i.e., to a device or a device component for outputting audio signals and/or image signals. The output device may be designed, for example, as a screen and/or as a speaker.

This is followed by a reception of an operating signal by the speech recognition and language determination device, the operating signal describing an operational action of the user detected by the operating device for indicating the operating language to be set and/or the operating mode to be set. The operational action may be detected, for example, by an operating element, for example by a touch-sensitive screen, and may describe, for example, that the user wishes to use the second operating language.

A setting of the operating language to be set and/or the operating mode to be set takes place in response to the received operating signal. In other words, the desired operating language is set in response to the received operating signal.

With the method according to the disclosure, a simple and rapid switch of the operating language takes place. The operating language may be switched despite the possibly unknown language used in the first operating mode. Time is saved as a result of the faster switch of the operating language, enabling the user to more rapidly concentrate fully on the driving process again. By saving time, for example, before the user is able to drive away, a longer running of the engine, for example in a parking lot, is reduced and electricity is thereby saved. Alternatively, if the user sets the language when he is already driving, he may very quickly utilize the operating device and, for example, is not initially driving for minutes in the wrong direction, because he initially does not understand the operating language of the navigation device. Nonsensical dialogues may also be prevented or avoided, so that such nonsensical dialogues, including, for example, confusing and/or unwanted system concepts, are reduced.

The query signal, according to some embodiments of the present disclosure, may be an audio signal and/or an image signal. In other words, the request understandable in the second operating language may be an audio message and/or text message in the second operating language and/or an image message. In the image message option, in particular, the query for the confirmation of the setting of the second operating language is expressed in a generally understandable manner. If the user understands the second operating language and the query signal describes an audio message and/or text message, then he/she is addressed directly in his/her desired language.

In order for the user to be able to carry out the confirmation or specification of the operating mode to be set and/or the desired operating language to be set even more quickly, and to not have to glance away from the driving process, it may be provided according to one preferred embodiment that the speech recognition and language determination device sets the second operating mode for detecting the operational action. Thus, for example, if the operating device expects, based on the confidence value, that the user wishes to have set the second operating mode and/or the second operating language, the user is thus enabled to respond to the request for the acknowledgment signal with a voice input.

According to another embodiment, it may be provided that the speech recognition and language determination device may be used to generate a playback signal capable of describing a playback of the recognized voice input. The playback signal may then be transmitted from the speech recognition and language determination device to the output device. The words spoken by the user may thus, for example, be audibly output once again by the operating device or displayed, for example, on a screen. In response to a confirmation signal capable of describing the correct playback of the recognized voice input, it is determined that the voice input has been recognized correctly. The confirmation signal in this case may be generated, for example, in response to a further operational action of the user. In this way, a maloperation or faulty speech recognition may be prevented or the number of maloperations may be significantly reduced.

If the speech recognition and language determination device ascertains a percentage with which the speech recognition and language determination device correctly recognizes a voice input within a predetermined period of time, the operation steps of the method according to some embodiments which relate to the speech recognition and language determination device may be carried out depending on the ascertained percentage. For this purpose, the speech recognition and language determination device may count, for example, how often the user confirms the playback signal, i.e., confirms that the voice input was correctly understood. In this way, the operating device is able to "learn" whether the user understands the particular operating language well and the method according to the disclosure may then be carried out, for example, even if there are no results or few results, as to whether the user understands the first operating language and/or the second operating language.

The above stated object is also achieved by an operating device according to the disclosure. The operating device includes a speech recognition and language determination device, which is configured to carry out the operation steps relating to the speech recognition and language determination device in accordance with an embodiment of the disclosure. For this purpose, the speech recognition and language determination device may include at least one microprocessor and/or at least one microcontroller. Furthermore, the speech recognition and language determination device may include a program code, which is configured to carry out the embodiment of the method according to the disclosure when executed by the speech recognition and language determination device. The program code may be stored in a data memory of the speech recognition and language determination device.

The above stated object is also achieved by a motor vehicle according to the disclosure, which may be designed, for example, a passenger car. In some embodiments, the motor vehicle is characterized by the operating device. The aforementioned advantages result here as well.

The disclosure also includes refinements of the method, which include features previously described in connection with the refinements of the motor vehicle. For this reason, the corresponding refinements of the method according to the disclosure are not again described herein.

Exemplary embodiments of the disclosure are described below in the drawings of FIG. 1 and FIG. 2.

The exemplary embodiments explained below are preferred embodiments of the disclosure. In the exemplary embodiments, the described components of the embodiments each constitute individual features of the disclosure to be viewed independently from one another which also, each independently of one another, refine the disclosure, and are therefore to be considered also individually or in a different combination from that shown, as part of the disclosure. Other features of the disclosure previously described may also be added to the embodiments described.

In the drawings, functionally equivalent elements are provided with the same reference numerals.

FIG. 1 illustrates the principle of the method according to the disclosure by way of example with reference to a first exemplary embodiment.

For this purpose, FIG. 1 schematically shows a motor vehicle 10, which may, for example, be designed as a passenger car. The motor vehicle 10 includes an operating device 12, for example, an infotainment system of the motor vehicle 10 or a multimedia interface. The operating device 12 may, for example, include an operating element 13, which may be fitted, for example, as a pushbutton or swivel point. Alternatively, the operating element 13 may also be designed as a touch-sensitive screen. The operating device 12 of FIG. 1 also shows a speech recognition and language determination device 14, which may include, for example, a microprocessor 11 and/or a microcontroller. The speech recognition and language determination device may be designed, for example, as a control board, and may optionally include a data memory 15. The data memory 15 may be designed, for example, as a control chip. FIG. 1 shows an exemplary architecture of the speech recognition and language determination device 14. In one alternative architecture, the data memory 15 may be part of the microprocessor 11, for example. A program code, which is configured to carry out an embodiment of the method according to the disclosure when executed by the speech recognition and language determination device, may be stored in the data memory.

The speech recognition and language determination device 14 also includes a microphone 16 which, as familiar to those skilled in the art, may be configured as a microphone for recording a voice input of a user of the motor vehicle 10.

The individual components of the speech recognition and language determination device 14 may be interconnected via a suitable data communication link, which links are depicted in FIG. 1 (and in FIG. 2) as black connecting lines. However, additional and/or alternative data communication links are possible, which are not shown in the relevant figure. With the exemplary program code, it is possible to operate the speech recognition and language determination device in at least two operating modes. The operating modes in this case are distinguished by a corresponding operating language.

The operating device 12 also includes an output device 18, which may be designed, for example, as a screen and/or speaker. If the output device 18 is a touch-sensitive screen, then the operating element 13 may be integrated into the output device 18. The output device 18 preferably includes both a screen 20 and a speaker 22.

For example, the motor vehicle 10 may be a rental car that is rented by a user. The user may, for example, be a tourist from Germany who rents the motor vehicle 10 in an Arab country. In a basic setting, a first operating mode may be set, in which the operating language may be Arabic, for example.

The operating device 12 may, for example, be configured to operate a navigation system and/or multiple convenience systems of the motor vehicle 10 in response to the operational action of the user. Upon detection of a voice input, the exemplary microphone may generate an operating signal capable of describing the voice input, and the operating signal may be transmitted to the microprocessor 11, for example. The microprocessor may recognize the detected voice input as such upon receipt of the operating signal, for example, at operation step S1.

In the example of FIG. 1, when a power supply of the motor vehicle 10 is activated, a welcome text or a question as to where the user wishes to have the motor vehicle 10 navigated, may be output by the speaker 22. Since in the example of FIG. 1 the first operating mode is set, such a display or voice output may be in Arabic.

In the example, the user may not be sufficiently fluent in the Arabic language to understand the welcome text or the question. However, due to the language barrier, the user is unable to give a corresponding Arabic operating command or navigate through an operating menu to manually set the operating language.

As a voice input, he may therefore simply say any sentence, or any word in, for example, his native language. This voice input is recognized by the speech recognition and language determination device 14 (S1).

For this purpose, the user may, for example, speak a predefined, standardized sentence. The mechanism for checking whether the language of the voice input corresponds to the first operating language (S2), for example, may be actively activated by the user before entering the voice input by operating the operating element 13. Alternatively, however, it may be provided that the method according to the disclosure may be routinely run through, or it may depend on whether the user has already entered successful voice inputs. In the example of FIG. 1, however, this may not be the case since the user, for example, is using this motor vehicle 10 for the first time.

In some embodiments, for the checking process S2 a threshold value may be predefined in the data memory 15, which may indicate, for example, what minimum percentage of the voice input should be in the first operating language so that the first operating language is considered to be recognized. This can be helpful, for example, if the user speaks the first operating language but uses foreign words when speaking the operating language.

In the example of FIG. 1, the speech recognition and language determination device 14 recognizes, for example, that the user has not entered the voice input in Arabic. Depending on the result of this checking process S2, speech recognition and language determination device 14 may assign or allocate a confidence value to the voice input at operation step S3, it being possible for the confidence value to indicate, for example, that the voice input is with a probability of 90% the second operating language.

Optionally, it may be provided at this point that the speech recognition and language determination device 14 may generate, for example, a playback signal capable of describing the recognized sentence that the user spoke as voice input (S4), and this playback signal may, for example, be transmitted by the output device 18 (S5). The output device 18 may, for example, output this playback signal via the screen 20 (S6), or for example via the speaker 22. This allows the user account to check whether the voice input was recognized correctly. The user may confirm a correct recognition, for example, by means of an additional voice input in the second operating language or by actuating the operating element 13. On the basis of such a detected operational action, the operating element 13 or another component of the operating device 12 may, for example, generate an acknowledgment signal capable of describing the correct playback of the recognized voice input. In response to such a confirmation signal, the speech recognition and language determination devices may determine that voice input has been recognized correctly (S7).

Depending on the assigned confidence value, the speech recognition and language determination device may generate a query signal capable of describing a request understandable in the second operating language to the user for indicating the operating mode and/or the desired operating language, for example, in German "Would you like to set German as the operating language?", or an image sequence, for example the German national flag followed by a question mark (S8). The query signal may then be transmitted to the output device 18 (S5), and the latter may output the request signal (S6).

The user of FIG. 1 may, for example, so desire, and enter a corresponding voice input, or, alternatively, confirm it via the operating element 13. The operating signal received at operation step S9 may describe the desired operating language and/or confirmation, and set the second operating mode in response to the received operating signal to the speech recognition and language determination device (S10).

For example, if the user is a German tourist from whom the speech recognition and language determination device 14 has received a voice input, such as a sentence that the tourist has just addressed to a passenger in his native language, but the user also speaks Arabic and, in order to practice his Arabic skills while on vacation, wishes to continue to use the operating device 12 in the first operating language while using the motor vehicle 10, he may then express this via a corresponding operational action and the operating device 12 may continue to operate in the first operating mode.

Depending on the confidence value, it may optionally be provided that the second operating mode may already be set for detecting the operational action (S10). In this way, the speech recognition and language determination device is able to recognize a corresponding voice input by the user in his desired language (S1).

In some embodiments, the user may already have driven away with the motor vehicle 10. The fact that he does not have to focus his attention, for example, on an operating menu for setting the operating language and does not have to look at the screen 20, results in a valuable time savings for him, so that when needing to use the navigation system, he has this immediately available. Thus, he is not forced, for example, to remain idle in the parking lot for a while in order to set the operating language. If the motor vehicle 10 is an electric motor vehicle, this results in a power saving for him, because he does not remain idle for minutes with the engine running before driving away.

In some embodiments, during operation of the motor vehicle 10, each user's voice input may be displayed once again, for example, by a corresponding playback signal, as already described above (S6). In some embodiments, to operate the exemplary navigation system or the air conditioner, a confirmation of the user may be required in each case, and the respective confirmation signals capable of describing the correct recognition of the voice input (S1), may, for example, be counted (S11) by the speech recognition and language determination device 14. In this way, a percentage may be ascertained (S12) for the voice inputs that have been recognized correctly by the speech recognition and language determination device 14.

Alternatively, if the user used the operating device 12 in the first operating language, and if, for example, his pronunciation is not yet good enough, the speech recognition and language determination device 14 may determine or ascertain that only up to 80% of his voice inputs were correctly recognized (S1). In the speech recognition and language determination device 14, a threshold value may then be stored, capable of describing that the operation steps of the method according to the disclosure are carried out at a percentage of, for example, less than 90% of the recognized voice inputs. In some embodiments, after a predefined number of incorrectly recognized voice inputs, it is possible to check again (S4) and/or to query whether the user does not wish to switch into another operating language. Such a threshold value may be raised, for example, if the ascertained percentage changes during the course of a journey.

Figure 2:
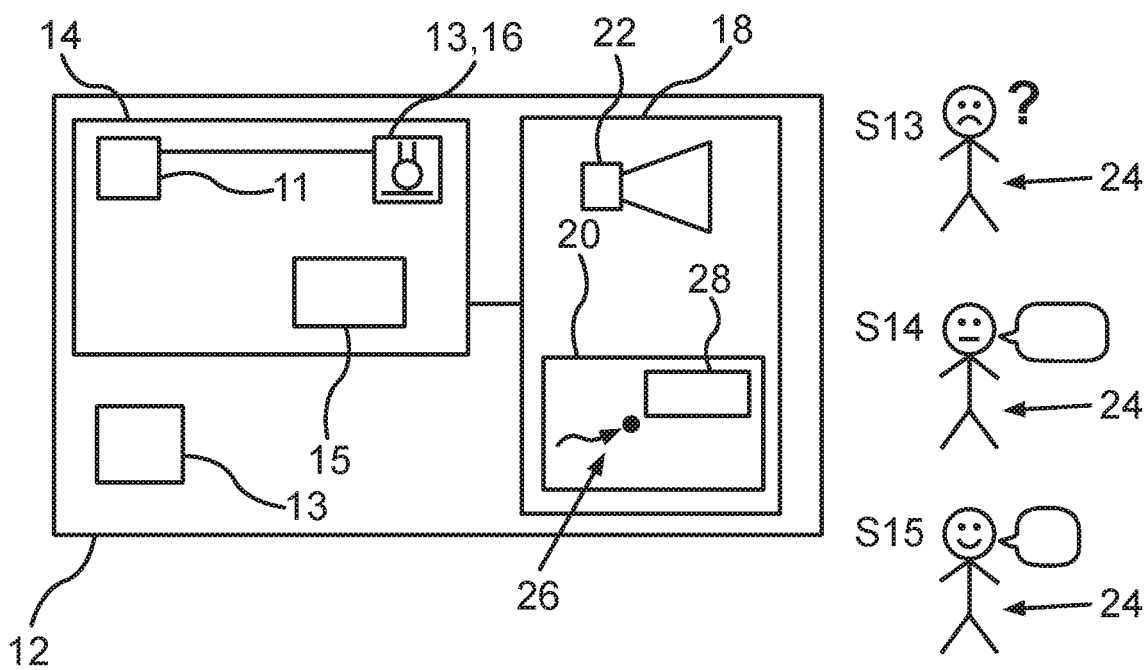
FIG. 2 is a schematic representation of another embodiment of the method according to the present disclosure.

FIG. 2 shows another exemplary embodiment of the method according to the disclosure with only differences with respect to the example of FIG. 1 being discussed below. The operating device 12 in this case may display, for example, by means of the output device 18, an image 26 of a set navigation program, as well as an optional text field 28 on which, for example, a piece of information about a navigation destination may be displayed. In FIG. 2, this piece of information may be indicated, for example, in Arabic characters, which the user 24 is unable to read and therefore does not know what the text message wishes to communicate to him (S13). At operation step S14, for example, he can say an arbitrary sentence, for example, "Please drive to Berlin" (S14). The voice input in this case is shown as a speech bubble. Thus, in FIG. 2, the user 24 may, for example, rent the motor vehicle 10 in Germany, a previous driver of the motor vehicle 10, for example, having set an operating mode in which the operating language is Arabic.

With the method according to the disclosure, for example, as described above with reference to FIG. 1, it is possible for the speech recognition and language determination device 14 to set an operating mode (S10) in which German is the operating language. For better clarity, the individual process steps in this case are not listed again in FIG. 2. At operation step S15 it is shown that the user 24 now understands the set operating language and is able to use the operating device 12.

On the whole, the exemplary embodiments show how the disclosure makes it possible to change a language by recognizing the driver's language.

According to another embodiment, a program code may be implemented in the motor vehicle 10, wherein the program code can be, for example, an algorithm, with which the language of the user 24 may be recognized. If the language of the user 24 does not correspond to the set operating language, it may be asked, for example by outputting the above-described query signal in the second operating language, whether to switch to the recognized language (for example by displaying a corresponding text with the query "Would you like to switch to German?"). The voice input to be recognized in this case is, for example, a sentence having a minimum, predefined number of words and/or a minimum speaking duration or time of the voice input.

The exemplary algorithm may, for example, be activated only when needed, so that normally there are no disadvantages or calculation times.

The algorithm may be started as soon as the recognition of the voice input (S1) in the set operating language is very poor and only very low detection probabilities are calculated, i.e., a low confidence value is assigned (S3). A threshold of probability may be raised in the course of a journey in which voice inputs have already been successfully carried out. If, for example, the user 24 has already successfully entered inputs in the set operating language, then it can be assumed, for example, that the user 24 masters the set operating language and can switch directly to, for example, "switch language to Arabic" as the voice input.

According to another embodiment, the spoken input may be buffered. If the user 24 says, for example, in the Arabic operating mode: "Please navigate to Munich", the following sequence may be carried out, for example, recognition of an Arabic sentence may fail (S1); the exemplary speech recognition algorithm may be started; the algorithm may recognize German as a high probability; a query signal of the question "Would you like to switch to German?" may be output (S6); with the aid of a "yes" response, it is possible to switch to the German operating language. In the case of a "no" response, an operating menu may, for example, display the following menu items or functions (S6): 1—change to German, 2—English (in English if, for example, English has the closest probability), 3—maintain Arabic (for example, in Arabic font). In the language now selected, the previous saved sentence "Please navigate to Munich" may be evaluated.

This advantageously results in a simple switch of the language. A switch of the operating language may take place even if the language is unknown. A more rapid switch of the operating language takes place, and time is saved, which may be relevant, in particular, for electric motor vehicles 10. The problem of a user 24 having to cope and drive with an unknown operating language is reduced or completely avoided. Thus, nonsensical dialogues potentially resulting in confusing and unwanted system concepts may be reduced or avoided, for example, when the user 24 says "Navigate to Amberg", which could be confused, for example, with "the radio is changed to AM".

The invention claimed is:

1. A method for operating a motor vehicle, comprising:
    activating an operating device of the motor vehicle operating in a first operating language in a first operating mode;
    recognizing, by a speech recognition and language determination device inside the operating device that operates in the first operating mode, a voice input by a user of the motor vehicle;
    checking, by the speech recognition and language determination device, whether a language of the voice input corresponds to the first operating language;
    assigning, by the speech recognition and language determination device, a confidence value to the voice input depending on a result of the checking, wherein the confidence value describes a probability with which the language of the voice input is a second operating language of a second operating mode of the operating device;
    generating, by the speech recognition and language determination device, a query signal describing a request in the second operating language understandable to the user, wherein the request indicates the second operating mode to be set with the second operating language, depending on the assigned confidence value;
    transmitting, by the speech recognition and language determination device, the query signal to an output device to output the query signal;
    receiving, by the speech recognition and language determination device, an operating signal, wherein the operating signal describes an operational action of the user and indicates whether the second operating language is a desired operating language;
    changing, by the speech recognition and language determination device, the operating device from the first operating mode to the second operating mode in response to the received operating signal; and
    ascertaining, by the speech recognition and language determination device, a frequency with which the speech recognition and language determination device correctly recognizes the voice input within a predefined period of time, wherein the changing of the first operating mode to the second operating mode is carried out depending on the ascertained frequency.

2. The method of claim 1, wherein the request in the second operating language understandable to the user comprises an audio message or a text message in the second operating language, or an image message.

3. The method of claim 1, further comprising:
    setting, by the speech recognition and language determination device, the operating device in the second operating mode to detect the operational action.

4. The method of claim 1, further comprising:
    generating, by the speech recognition and language determination device, a playback signal, the playback signal describing a playback of the recognized voice input;
    transmitting, by the speech recognition and language determination device, the playback signal to the output device; and
    determining, by the speech recognition and language determination device, that the voice input has been correctly recognized in response to a confirmation signal from the user, wherein the confirmation signal describes that the playback of the recognized voice input is correct.

5. The method of claim 1, further comprising:
    operating, by the user of the motor vehicle, a convenience system of the motor vehicle through the voice input of the user, wherein the operating device serves as a user interface between the user and the convenience system.

6. The method of claim 5, wherein the operating the convenience system of the motor vehicle comprises operating a navigation device, an auxiliary heater, or an air conditioning of the motor vehicle.

7. The method of claim 1, wherein the activating the operating device comprises activating a multimedia interface or infotainment system.

8. An operating device of a motor vehicle, comprising:
    an operating element configured to detect an operational action by a user of the motor vehicle;
    a speech recognition and language determination device located in the operating device inside the motor vehicle; and
    an output device configured to output a query signal, the query signal generated and transmitted by the speech recognition and language determination device,
    wherein the operating device is located inside the motor vehicle, and is configured to be used in a first operating language in a first operating mode and a second operating language in a second operating mode; and
    wherein the speech recognition and language determination device is configured to:

assign a confidence value to a voice input, wherein the confidence value describes a probability with which a language of the voice input is the second operating language;

change the operating device from the first operating mode to the second operating mode when an operating signal is received from the user indicating the second operating language is a desired operating language; and ascertain a frequency with which the speech recognition and language determination device correctly recognizes the voice input within a predefined period of time, wherein the changing of the first operating mode to the second operating mode is carried out depending on the ascertained frequency.

9. The operating device of claim 8, wherein the speech recognition and language determination device is further configured to:

recognize the voice input by the user of the motor vehicle when the operating device operates in the first operating mode using the first operating language;

check whether the language of the voice input corresponds to the first operating language;

generate the query signal describing a request in the second operating language, wherein the request indicates the second operating mode to be set with the second operating language depending on the assigned confidence value;

transmit the query signal to the output device; and receive the operating signal, the operating signal describing the operational action of the user and indicating whether the second operating language is a desired operating language.

10. The operating device of claim 8, wherein the speech recognition and language determination device comprises:

at least one microprocessor or at least one microcontroller; and a data memory comprising a program code, wherein the program code is configured to carry out operations when executed by the speech recognition and language determination device.

11. The operating device of claim 10, wherein the speech recognition and language determination device further comprises a microphone, the microphone configured to record a voice input of the user.

12. The operating device of claim 8, wherein the output device comprises a screen.

13. The operating device of claim 8, wherein the output device comprises a speaker.

14. The operating device of claim 8, further comprising a user interface between the user of the motor vehicle and a convenience system of the motor vehicle.

15. The operating device of claim 14, further comprising a multimedia interface or infotainment system.

16. The operating device of claim 14, wherein the convenience system comprises a navigation device, an auxiliary heater, or an air conditioning.

17. The operating device of claim 8, wherein the operating element comprises a pushbutton, a swivel point or a touch-sensitive screen.

* * * * *